(12) United States Patent
Baruch et al.

(10) Patent No.: US 11,734,180 B2
(45) Date of Patent: Aug. 22, 2023

(54) MEMORY EFFICIENT APPROACH TO EXTENDING CACHE

(71) Applicant: EMC IP Holding Company LLC, Hopkinton, MA (US)

(72) Inventors: Oran Baruch, Tel Aviv (IL); Vamsi K. Vankamamidi, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 156 days.

(21) Appl. No.: 17/386,974

(22) Filed: Jul. 28, 2021

(65) Prior Publication Data

US 2023/0029706 A1  Feb. 2, 2023

(51) Int. Cl.
  *G06F 12/08* (2016.01)
  *G06F 12/0864* (2016.01)
(52) U.S. Cl.
  CPC .. *G06F 12/0864* (2013.01); *G06F 2212/1044* (2013.01); *G06F 2212/608* (2013.01)

(58) Field of Classification Search
  None
  See application file for complete search history.

(56) References Cited

U.S. PATENT DOCUMENTS

| | | | |
|---|---|---|---|
| 8,375,174 B1 * | 2/2013 | Cartmell | G06F 12/0284 711/170 |
| 9,632,932 B1 * | 4/2017 | Sutardja | G06F 3/064 |
| 2016/0203083 A1 * | 7/2016 | Park | G06F 11/34 711/122 |
| 2017/0206166 A1 * | 7/2017 | Kumar | G06F 16/2246 |
| 2020/0348867 A1 * | 11/2020 | Chanler | G06F 3/0611 |

* cited by examiner

*Primary Examiner* — Tracy C Chan
(74) *Attorney, Agent, or Firm* — Krishnendu Gupta; Deepika Bhayana; Derek Lam

(57) ABSTRACT

A method may use memory efficiently to extend cache. A processor receives a request to write data. The size of the data in the write request is compared to a threshold. When the size of the data exceeds the threshold, the data is stored on a solid state device. Page descriptors for the data on the solid state device are stored in a metadata log, and a reference to a first page descriptor of the page descriptors in the metadata log is stored in a first hash table in memory.

20 Claims, 7 Drawing Sheets

Store the data in a non-volatile random access memory 705

Store, in a metadata log, at least one page descriptor for the data in the NVRAM 710

Store, in a second hash table in memory, a reference to the at least one page descriptor in the metadata log 715

MEMORY EFFICIENT APPROACH TO EXTENDING CACHE

BACKGROUND

Technical Field

The disclosure is related to the field of data storage, and more particularly to extending cache in a memory efficient manner.

SUMMARY OF THE INVENTION

One aspect of the current technique is a memory efficient method for extending cache. A processor receives a request to write data. The size of the data in the write request is compared to a threshold. When the size of the data exceeds the threshold, the data is stored on a solid state device. Page descriptors for the data on the solid state device are stored in a metadata log, and a reference to a first page descriptor of the page descriptors in the metadata log is stored in a first hash table in memory.

When the size of the data is below the threshold, the data is stored in a non-volatile random access memory. At least one page descriptor for the data is stored in the metadata log. A reference to at least one page descriptor for the data in the metadata log is stored in a second hash table in memory.

In some embodiments, the threshold is 1 MB.

The processor may receive a request to read the data, and check the first and second hash tables for entries associated with the data. When both the first and second hash tables include entries associated with the data, the reference, from the first hash table, to the first page descriptor in the metadata log may be used to retrieve the data from the solid state device. The reference, in the second hash table, to the at least one page descriptor in the metadata log may be used to retrieve the data from the non-volatile random access memory. At least a portion of the data from the solid state device may be replaced with the data from the non-volatile random access memory.

A sequence number in the first page descriptor associated with the data from the solid state device may be compared to a sequence number in the at least one page descriptor associated with the data from the non-volatile random access memory. If the sequence number for the data from the non-volatile random access memory is larger than the sequence number for the data from the solid state device, at least a portion of the data from the solid state device may be replaced with the data from the non-volatile random access memory. If the sequence number for the data from the non-volatile random access memory is smaller than the sequence number for the data from the solid state device, the read request may be responded to with the data from the solid state device.

When the second hash table, but not the first hash table, includes an entry associated with the data, the data from the non-volatile random access memory may be retrieved.

Another aspect of the current technique is a system with at least one processor. The at least one processor is configured to receives a request to write data and compare the size of the data in the write request to a threshold. When the size of the data exceeds the threshold, the at least one processor causes the data to be stored on a solid state device. The at least one processor causes the page descriptors for the data on the solid state device to be stored in a metadata log, and a reference to a first page descriptor of the page descriptors in the metadata log to be stored in a first hash table in memory. The at least one processor may be configured to perform any other processes in conformance with the aspect of the current techniques described above.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Generally, a storage system includes cache memory systems to store frequently accessed data. Copies of data may be stored in data buffers, and descriptors of the data (e.g., logical address, volume to which the data belongs, checksum of the data, dirty sector) may be stored in memory. A descriptor may correspond to a single page of data and occupy significantly less space than the data itself (e.g., 64 bytes, compared to 4K). Some storage systems also use Non-Volatile Random Access Memory (NVRAM), in addition to its cache memory system.

Techniques, such as those described in co-pending U.S. application Ser. No. 17/238,946, entitled "System and Method for Extending NVRAM-Based Write-Cache onto SSDs", enable a storage system to also use solid state drives (SSDs) as cache, further improving performance of the storage system. Although storage capacity on the NVRAMs and SSDs can be made available for this purpose, the amount of memory available on the cache memory system to store page descriptors remains the same. Consequently, the finite amount of memory in the cache memory system can limit the effectiveness of such techniques to extend cache.

To improve performance of storage systems with extended cache, descriptors in memory of a cache memory system can refer to data stored in a data buffer, NVRAM, or SSD. Depending on the information in a descriptor, the descriptor can be used to locate and retrieve a single page of data, such as data stored in a data buffer, or multiple pages of data, such as data stored on an SSD. In this manner, the memory of a cache memory system can be efficiently configured for locating data beyond its own cache.

In at least some implementations in accordance with the techniques as described herein, one or more of the following advantages can be provided: improved performance through extension of the cache, ability to reference larger amounts of stored data from a cache with limited size.

Figure 1:
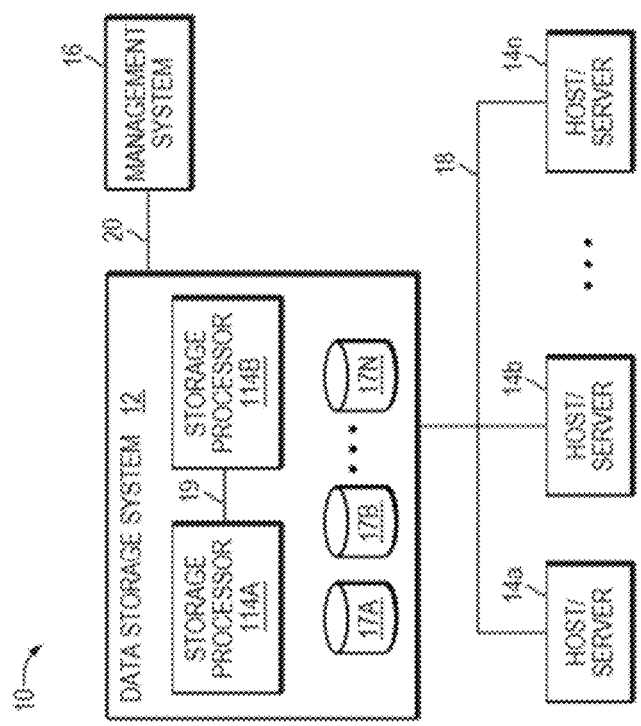
FIG. 1 depicts an example embodiment of a computer system that may be used in connection with performing the techniques described herein.

FIG. 1 depicts an example embodiment of a computer system 10 that may be used in connection with performing the techniques described herein. The system 10 includes one or more data storage systems 12 connected to server or hosts 14a-14n through communication medium 18. The system 10 also includes a management system 16 connected to one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the hosts 14a-14n may access and communicate with the data storage systems 12, and may also communicate with other components (not shown) that may be included in the system 10. In one embodiment, the communication medium 20 may be a LAN connection and the communication medium 18 may be an iSCSI, Fibre Channel, Serial Attached SCSI, or Fibre Channel over Ethernet connection.

Each of the hosts 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of a variety of connections in accordance with the type of communication medium 20. The processors included in the hosts 14a-14n and management system 16 may be any one of a variety of proprietary or commercially available single or multi-processor system, or other type of commercially available processors able to support traffic in accordance with any embodiments described herein.

It should be noted that the particular examples of the hardware and software that may be included in the data storage systems 12 are described herein in more detail, and may vary with each particular embodiment. Each of the hosts 14a-14n, the management system 16 and data storage systems 12 may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts 14a-14n, management system 16, and data storage systems 12 may be connected to their respective communication medium 18, 20 may pass through other communication devices, such as switching equipment that may exist such as a phone line, a repeater, a multiplexer, or even a satellite. In one embodiment, the hosts 14a-14n may communicate with the data storage systems 12 over an iSCSI or a Fibre Channel connection and the management system 16 may communicate with the data storage systems 12 over a separate network connection using TCP/IP. It should be noted that although FIG. 1 illustrates communications between the hosts 14a-14n and data storage systems 12 being over a first communication medium 18, and communications between the management system 16 and the data storage systems 12 being over a second different communication medium 20, other embodiments may use the same connection. The particular type and number of communication mediums and/or connections may vary in accordance with particulars of each embodiment.

Each of the hosts 14a-14n may perform different types of data operations in accordance with different types of tasks. In the embodiment of FIG. 1, any one of the hosts 14a-14n may issue a data request to the data storage systems 12 to perform a data operation. For example, an application executing on one of the hosts 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. The management system 16 may, for example, display information about a current storage volume configuration, provision resources for a data storage system 12, and the like.

Each of the data storage systems 12 may include one or more data storage devices 17a-17n. Unless noted otherwise, data storage devices 17a-17n may be used interchangeably herein to refer to hard disk drive, solid state drives, and/or other known storage devices. One or more data storage devices 17a-17n may be manufactured by one or more different vendors. Each of the data storage systems included in 12 may be inter-connected (not shown). Additionally, the data storage systems 12 may also be connected to the hosts 14a-14n through any one or more communication connections that may vary with each particular embodiment. The type of communication connection used may vary with certain system parameters and requirements, such as those related to bandwidth and throughput required in accordance with a rate of I/O requests as may be issued by the hosts 14a-14n, for example, to the data storage systems 12. It should be noted that each of the data storage systems 12 may operate stand-alone, or may also be included as part of a storage area network (SAN) that includes, for example, other components such as other data storage systems 12. The particular data storage systems 12 and examples as described herein for purposes of illustration should not be construed as a limitation. Other types of commercially available data storage systems 12, as well as processors and hardware controlling access to these particular devices, may also be included in an embodiment.

In such an embodiment in which element 12 of FIG. 1 is implemented using one or more data storage systems 12, each of the data storage systems 12 may include code thereon for performing the techniques as described herein.

Servers or hosts, such as 14a-14n, provide data and access control information through channels on the communication medium 18 to the data storage systems 12, and the data storage systems 12 may also provide data to the host systems 14a-14n also through the channels 18. The hosts 14a-14n may not address the disk drives of the data storage systems 12 directly, but rather access to data may be provided to one or more hosts 14a-14n from what the hosts 14a-14n view as a plurality of logical devices or logical volumes (LVs). The LVs may or may not correspond to the actual disk drives. For example, one or more LVs may reside on a single physical disk drive. Data in a single data storage system 12 may be accessed by multiple hosts 14a-14n allowing the hosts 14a-14n to share the data residing therein. An LV or LUN (logical unit number) may be used to refer to the foregoing logically defined devices or volumes.

The data storage system 12 may be a single unitary data storage system, such as single data storage array, including two storage processors 114A, 114B or computer processing units. Techniques herein may be more generally used in connection with any one or more data storage system 12 each including a different number of storage processors 114 than as illustrated herein. The data storage system 12 may include a data storage array 116, including a plurality of data storage devices 17a-17n and two storage processors 114A, 114B. The storage processors 114A, 114B may include a central processing unit (CPU) and memory and ports (not shown) for communicating with one or more hosts 14a-14n. The storage processors 114A, 114B may be communicatively coupled via a communication medium such as storage processor bus 19. The storage processors 114A, 114B may be included in the data storage system 12 for processing requests and commands. In connection with performing techniques herein, an embodiment of the data storage system 12 may include multiple storage processors 114 including more than two storage processors as described. Additionally, the two storage processors 114A, 114B may be used in connection with failover processing when communicating with the management system 16. Client software on the management system 16 may be used in connection with performing data storage system management by issuing commands to the data storage system 12 and/or receiving responses from the data storage system 12 over connection 20. In one embodiment, the management system 16 may be a laptop or desktop computer system.

The particular data storage system 12 as described in this embodiment, or a particular device thereof, such as a disk, should not be construed as a limitation. Other types of commercially available data storage systems 12, as well as processors and hardware controlling access to these particular devices, may also be included in an embodiment.

In some arrangements, the data storage system 12 provides block-based storage by storing the data in blocks of logical storage units (LUNs) or volumes and addressing the blocks using logical block addresses (LBAs). In other arrangements, the data storage system 12 provides file-based storage by storing data as files within a file system and locating file data using inode structures. In yet other arrangements, the data storage system 12 stores LUNs and file systems, stores file systems within LUNs, and so on.

The two storage processors 114A, 114B (also referred to herein as "SP") may control the operation of the data storage system 12. The processors may be configured to process requests as may be received from the hosts 14a-14n, other data storage systems 12, management system 16, and other components connected thereto. Each of the storage processors 114A, 114B may process received requests and operate independently and concurrently with respect to the other processor. With respect to data storage management requests, operations, and the like, as may be received from a client, such as the management system 16 of FIG. 1 in connection with the techniques herein, the client may interact with a designated one of the two storage processors 114A, 114B. Upon the occurrence of failure of one the storage processors 114A, 114B, the other remaining storage processors 114A, 114B may handle all processing typically performed by both storage processors 114.

Figure 2:
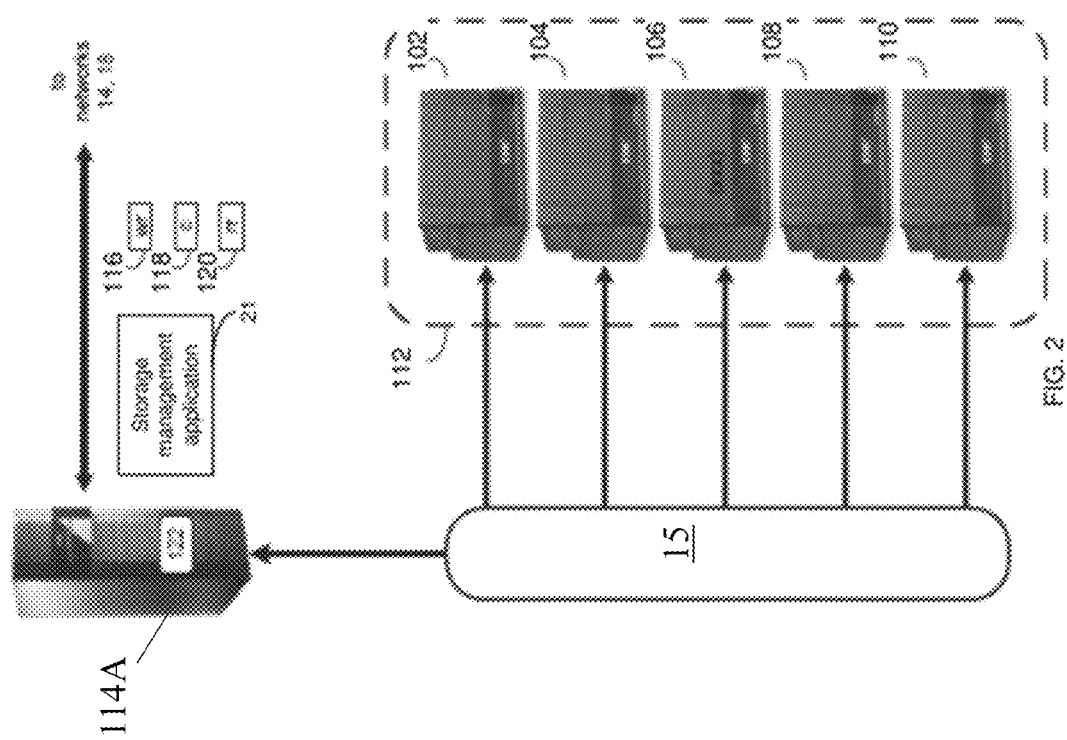
FIG. 2 depicts an exemplary data storage system used in the computer system of FIG. 1.

FIG. 2 depicts an exemplary data storage system 12 used in the computer system 10 of FIG. 1. Data storage system 12 may include at least one storage processor 114A and a plurality of storage targets 102, 104, 106, 108, 110. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, data storage system 12 is shown to include five storage targets (e.g., storage targets 102, 104, 106, 108, 110) this is for example purposes only and is not intended limit the present disclosure. For instance, the actual number of storage targets may be increased or decreased depending upon, e.g., the level of redundancy/performance/capacity required.

Further, the storage targets 102, 104, 106, 108, 110 included with data storage system 12 may be configured to form a plurality of discrete storage arrays. For instance, and assuming for example purposes only that storage system 12 includes, e.g., ten discrete storage targets, a first five targets (of the ten storage targets) may be configured to form a first RAID array and a second five targets (of the ten storage targets) may be configured to form a second RAID array.

Examples of storage targets 102, 104, 106, 108, 110 may include one or more data arrays, wherein a combination of storage targets 102, 104, 106, 108, 110 (and any processing/control systems associated with storage management application executing on the management system 16 may form data array 112.

The manner in which storage system 12 is implemented may vary depending upon e.g., the level of redundancy/performance/capacity required. For example, storage system 12 may be configured as a SAN (i.e., a Storage Area Network), in which storage processor 114A may be, e.g., a dedicated computing system and each of storage targets 102, 104, 106, 108, 110 may be a RAID device.

In the example where storage system 12 is configured as a SAN, the various components of storage system 12 (e.g., storage processor 114A, and storage targets 102, 104, 106, 108, 110) may be coupled using network infrastructure 15, examples of which may include but are not limited to an Ethernet (e.g., Layer 2 or Layer 3) network, a fiber channel network, an InfiniBand network, or any other circuit switched/packet switched network.

In some implementations, storage processor 114A may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 114A may initially store content 118 within front end cache memory system 122. Depending upon the manner in which front end cache memory system 122 is configured, storage processor 114A may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Figure 3:
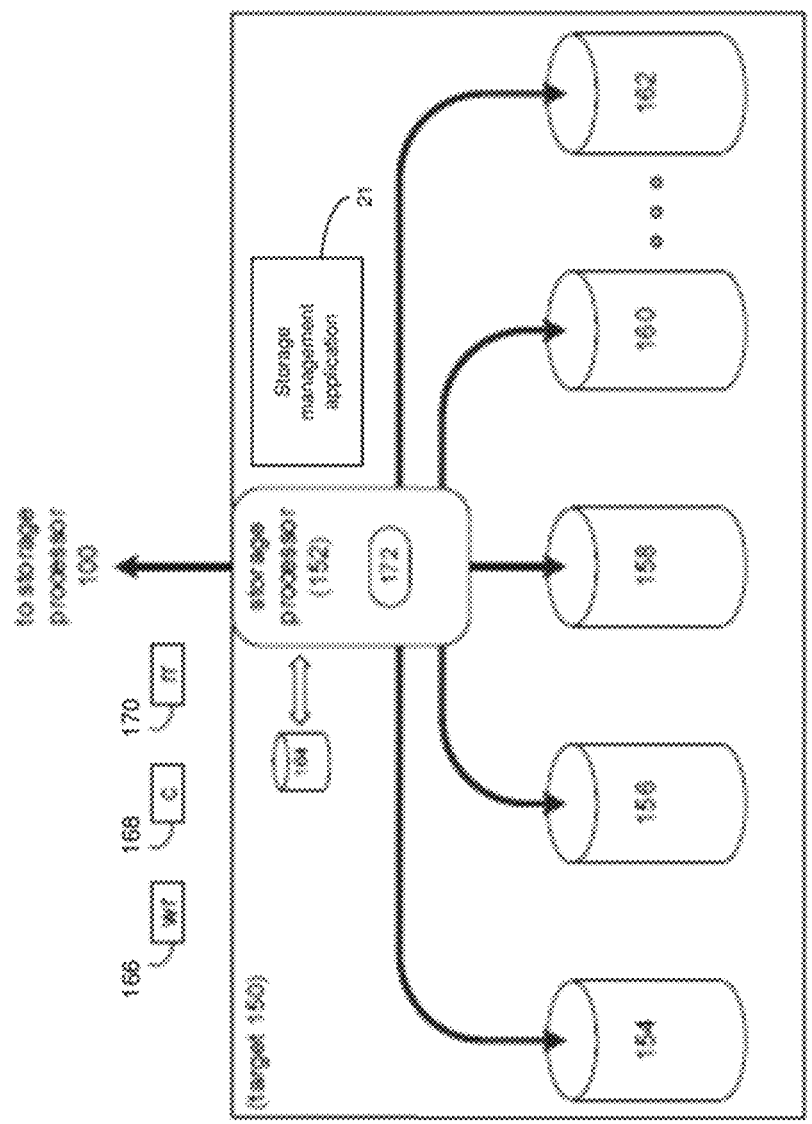
FIG. 3 is an exemplary target that may be used in the data storage system of FIGS. 1 and 2.

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. Examples of storage devices 17a-17e may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 17a-17e). Storage devices 17a-17e may be configured to provide various levels of performance and/or high availability (e.g., via storage management process 21). For example, one or more of storage devices 17a-17e (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 17a-17e (or any of the above-noted storage devices) may be configured as a RAID 1 array, in which data is mirrored between storage devices. By mirroring data between storage devices, a level of high availability may be achieved as multiple copies of the data may be stored within storage devices 17a-17e.

While storage devices 17a-17e are discussed above as being configured in a RAID 0 or RAID 1 array, this is for example purposes only and not intended to limit the present disclosure, as other configurations are possible. For example, storage devices 17a-17e may be configured as a RAID 3, RAID 4, RAID 5 or RAID 6 array.

While in this particular example, target 150 is shown to include five storage devices (e.g., storage devices 17a-17e), this is for example purposes only and not intended to limit the present disclosure. For instance, the actual number of storage devices may be increased or decreased depending upon, e.g., the level of redundancy/performance/capacity required.

The manner in which target 150 is implemented may vary depending upon e.g., the level of redundancy/performance/capacity required. For example, target 150 may be a RAID device in which storage processor 152 is a RAID controller card and storage devices 17a-17e are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of a storage management application 21. The instruction sets and subroutines of storage management application 21, which may be stored on a storage device coupled to storage processor 152, may be executed by one or more processors and one or more memory architectures included with storage processor 152. Storage device 164 may include but is not limited to any of the above-noted storage devices.

As discussed above, storage system 12 may be configured as a SAN, wherein storage processor 114A may be a dedicated computing system and each of storage devices 17a-17e may be a RAID device. Accordingly, when storage processor 114A processes data requests 116, 120, storage processor 114A (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

Figure 4:
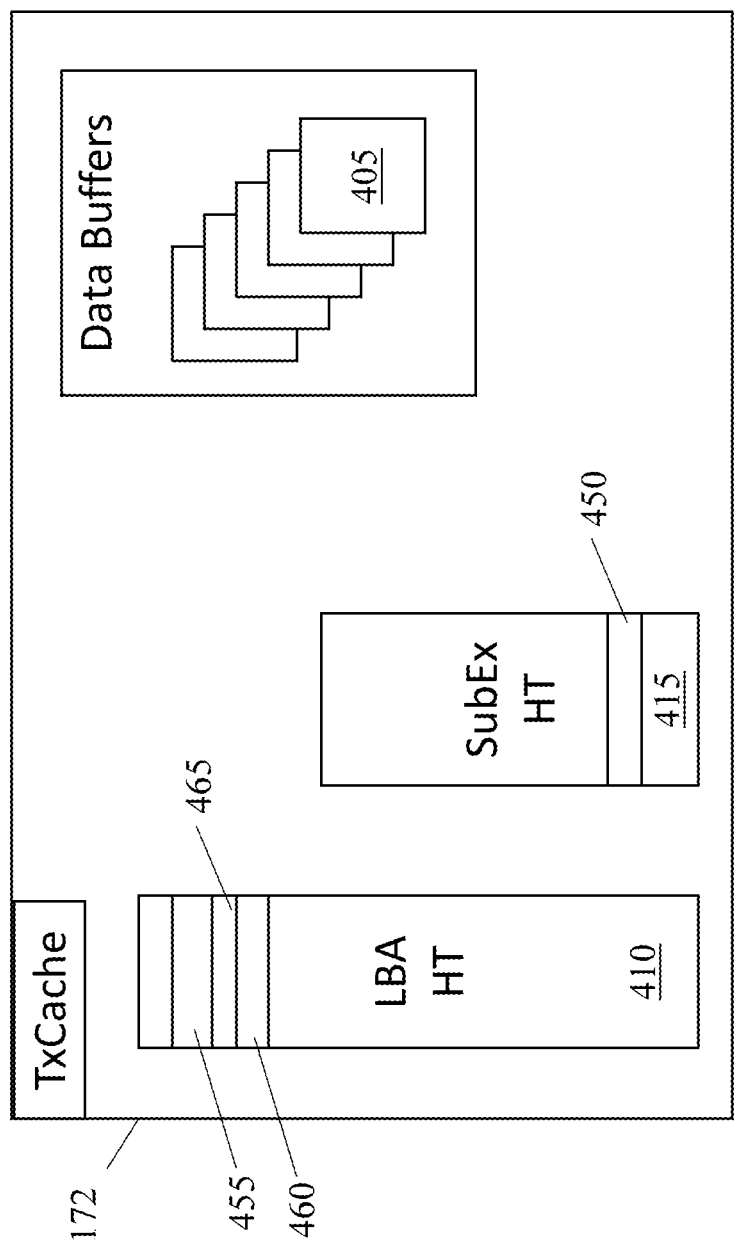
FIG. 4 is a schematic diagram of a cache memory system used by the target of FIG. 3.

FIG. 4 is a schematic diagram of a cache memory system 172 used by a target 150 of the storage system 12. The cache memory system 172 includes data buffers 405a, 405b, . . . , 405n (individually and collectively, "405") that store pages of data. The cache memory system 172 also includes two tables. One table, a logical block address (LBA) hash table (HT) 410, stores page descriptors corresponding to the pages of data stored in the data buffers 405 or on NVRAM 520, as described in more detail below. When the LBA HT 410 receives a logical block address, the LBA HT 410 returns a page descriptor for a page of data stored in the data buffer 405, or for data in NVRAM 520. In many embodiments, each page descriptor stored in the LBA HT 410 corresponds to one page of data. In some embodiments, the page descriptor includes a sequence number indicating the number of times data on that page has been updated.

The other table, the Subextent (SubEx) hash table (HT) 415, include descriptors referring to data larger than the granularity of the data buffers 405. In some embodiments, the SubEx HT 415 refers only to data that is larger than 1 MB, which has been stored on a solid state drive (SSD) 17. In some embodiments, a descriptor in the SubEx HT 415 includes the physical address on the SSD 17 where the data begins and the size of the data, or the range of addresses corresponding to the data. Alternatively, or additionally, the descriptor identifies the location in the metadata (MD) log 505, described in more detail below, of the first page descriptor corresponding to the stored data, and the number of page descriptors covering the data. In this manner, the storage system 12 effectively extends its cache to SSDs, while efficiently representing the data in memory.

Figure 5:
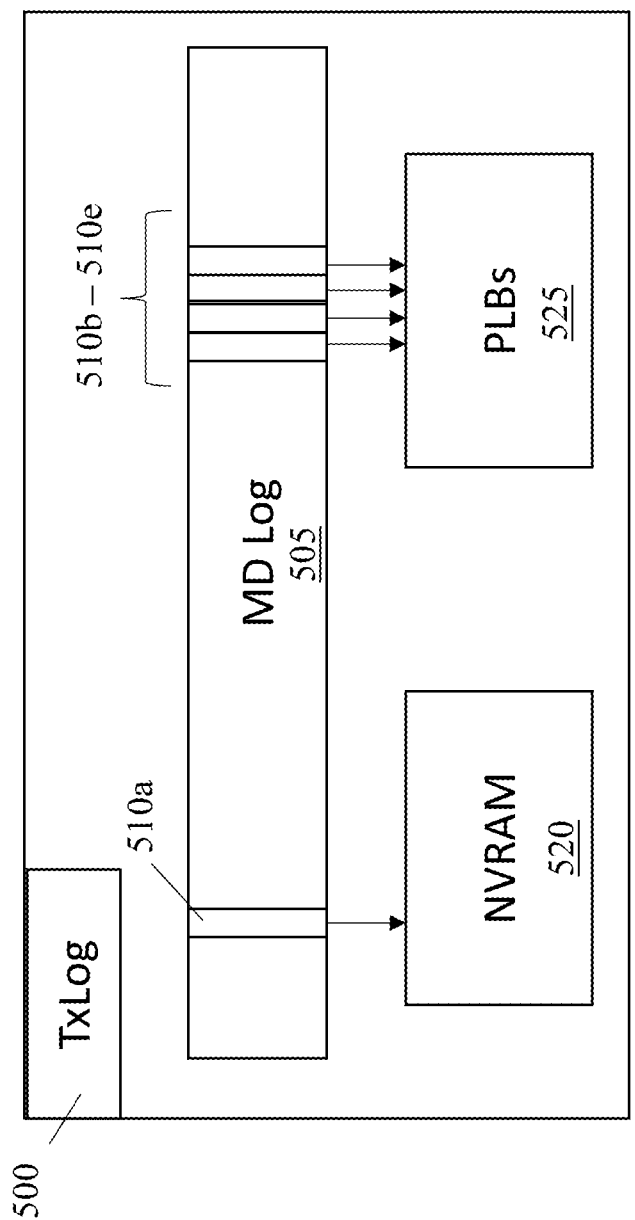
FIG. 5 is a schematic diagram of a log system used by the target of FIG. 4.

FIG. 5 is a schematic diagram of a log system (TxLog) 500 used by a target 150. The TxLog 500 uses a metadata (MD) log 505 to manage persistent storage in NVRAM 520 and on the SSDs 17a-17n. In this embodiment, the NVRAM 520 stores pages of data in buffers, and the SSDs 17a-17n store data in physical layer blocks (PLBs) 525. In many embodiments, the PLBs 525 are split PLBs 525, e.g., a PLB 525 may be split such that data may be written to only one portion of the PLB 525.

The TxLog 500 includes page descriptors of data stored on the NVRAM 520 and SSDs 17a-17n, and in some embodiments, the page descriptors may be arranged in a ring configuration. The storage system creates and stores in the MD log 505 a page descriptor for each page of the data. For example, as shown in FIG. 5, the MD log 505 may store one page descriptor 510a for a page stored in NVRAM, and four page descriptors 510b-510e for four pages stored on the PLBs 525 of an SSD 17. In some embodiments, a page descriptor 510 includes the location of the data on the NVRAM 520 or SSD 17 and the checksum of the data. The page descriptor 510 may also include a sequence number indicating the number of times data on that page has been updated.

When the storage system 12 receives a write request, the storage system 12 determines the size of the data. If the size of the data exceeds a certain amount, such as 1 MB, the data is written to a SSD 17. For every page of data stored on the PLBs 525 of the SSD 17, the storage system 12 calculates a checksum and stores this checksum, along with other metadata (such as a sequence number), in a page descriptor 510 in the MD log 505. The storage system 12 also creates a descriptor 450 in the SubEx HT 415 that identifies the location of the first page descriptor in the MD log 505, as well as the number of page descriptors covering the data. Alternatively, the descriptor 450 in the SubEx HT 415 include the range of addresses of the data on SSD 17, or the first address with the size of the data.

In some embodiments, the storage system 12 determines that the write request overwrites data stored in a data buffer 405 or in NVRAM 520. As the write request renders such data invalid, the storage system 12 invalidates the page descriptors 455, 460 for the overwritten data. For example, the storage system 12 may search the LBA HT 410 for the addresses corresponding to the write request. The page descriptors 455, 460 for any such addresses in the LBA HT 410 are invalidated, and the memory is freed to store page descriptors for other data.

In some situations, the size of data in a write request does not exceed the threshold (e.g., 1 MB). The storage system 12 caches the data in a data buffer 405, and persists the data in the NVRAM 520. The storage system 12 determines a checksum for the data and stores the checksum, address on the NVRAM 520, sequence number, and other metadata in a page descriptor 510a in the MD log 505. Moreover, a page descriptor 465 that identifies the data buffer 40 that stores the data and the page descriptor 510a in the MD log 505 corresponding to the data persisted therein may be added to the LBA HT 410.

When the storage system 12 receives a read request, the storage system 12 checks both the LBA HT 410 and the SubEx HT 415 for the addresses of the data. If the address is found only in the LBA HT 410, the corresponding page descriptor is used to retrieve the data.

If the address is found in both the LBA HT 410 and the SubEx HT 415, it is possible that a large amount of data (e.g., 1 MB) was previously written to a SSD 17 and subsequently, a write request overwrote a portion of that data. In the latter scenario, the update to the portion of data would have been stored in NVRAM 520, but not necessarily propagated to the SSD 17. Thus, the initial large amount of data must be retrieved from the SSD 17, and portions of this data replaced with entries in the NVRAM 520, to return current data to the host 14.

To accomplish this objective, the storage system 12 uses the descriptor in the SubEx HT 415 to identify page descriptors 510 in the MD log 505. These page descriptors 510 are used to retrieve data from the PLBs 525 of a SSD 17. Furthermore, the storage system 12 determines whether the page descriptor in the LBA HT 410 indicates that the read request corresponds to a dirty cache hit. For example, the sequence numbers from page descriptors in the LBA HT 410 and the SubEx HT 415. If the sequence number in the LBA HT 410 is higher, the storage system 12 uses the page descriptor in the LBA HT 410 to retrieve data from the NVRAM 520, and replaces portions of data retrieved from the PLBs 525 with the data obtained from the NVRAM 520. Checksums from the MD log 505 and/or LBA HT 410 are used to validate the data. If the sequence number in the SubEx HT 415 is higher, the storage system 12 may ignore the data in the NVRAM 520. In these situations, the checksum in page descriptors 510 on the SubEx HT 415 are used to validate the data.

Figure 6:
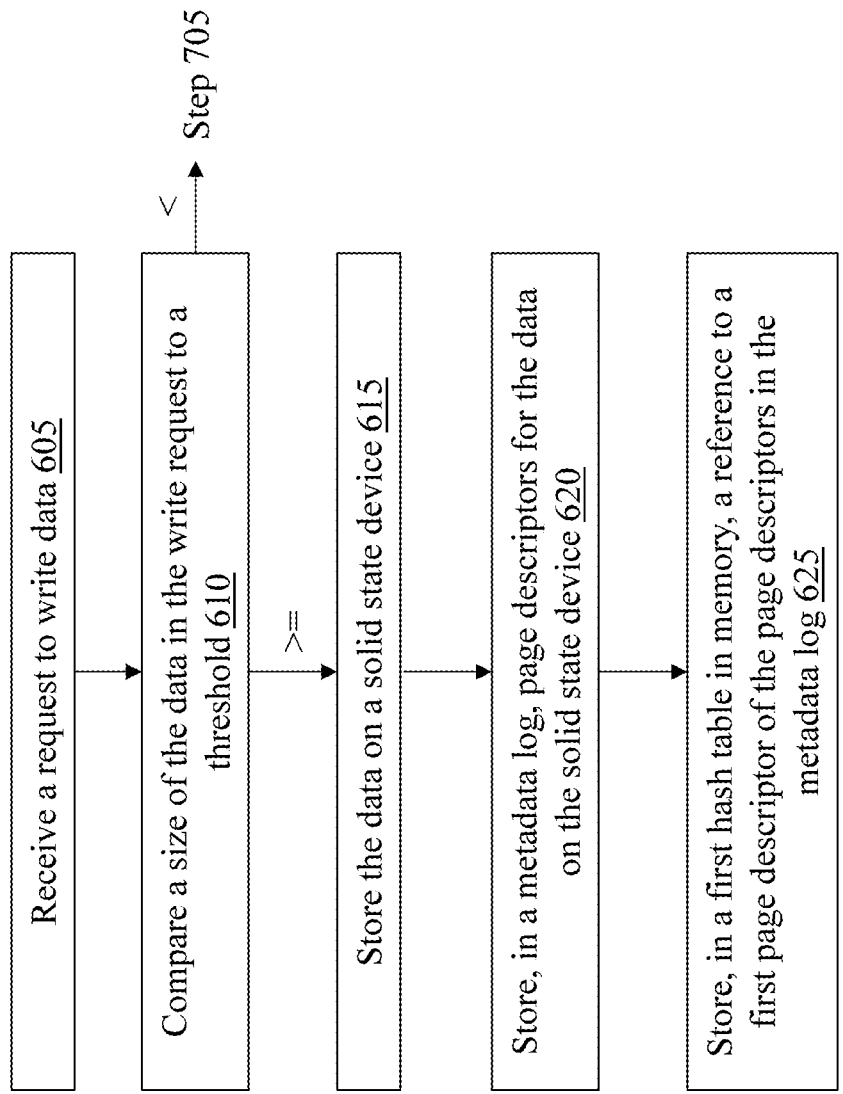
FIGS. 6 and 7 are exemplary flow diagrams of the techniques described herein.
Figure 7:
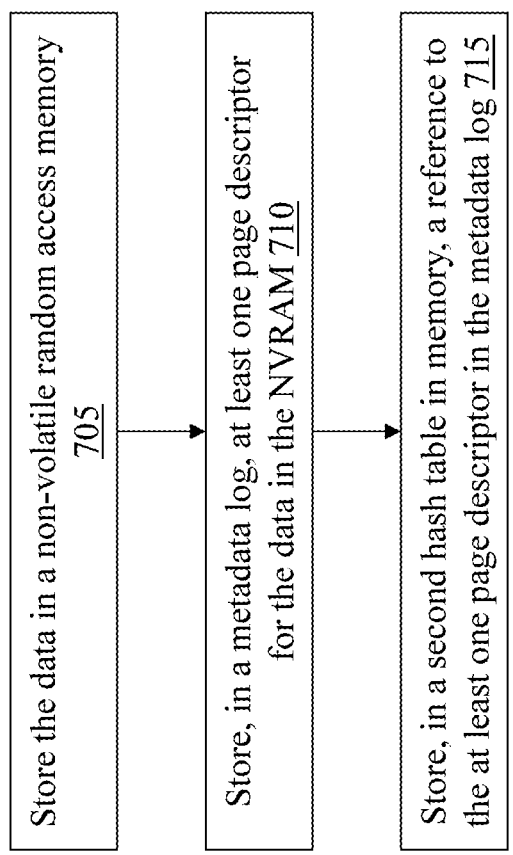

FIGS. 6 and 7 are exemplary flow diagrams of methods 500 and 600 describing techniques discussed herein. For the method illustrated in FIG. 6, a processor receives a request to write data (step 605). The processor compares the size of the data in the write request to a threshold (step 610). If the size of the data exceeds the threshold, the method proceeds to step 615. The data is stored on a solid state device (step 615). Page descriptors for the data on the solid state device are stored in a metadata log (step 620). A reference to a first page descriptor of the page descriptors in the metadata log is stored in a first hash table in memory (step 625).

If the size of the data is below threshold, the method proceeds to step 705. The data is stored in a non-volatile random access memory (step 705). At least one page descriptor for the data is stored in the metadata log (step 710). A reference to at least one page descriptor for the data in the metadata log is stored in a second hash table in memory (step 715).

It should again be emphasized that the implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A memory efficient method of extending cache, comprising:
   receiving, by a processor, a request to write data;
   comparing a size of the data in the write request to a threshold;
   when the size of the data exceeds the threshold,
      storing the data on a solid state device;
      storing, in a metadata log, page descriptors for the data on the solid state device; and
      storing, in a first hash table in memory, a reference to a first page descriptor of the page descriptors in the metadata log; and
   when the size of the data is below the threshold,
      storing the data in a non-volatile random access memory;
      storing, in the metadata log, at least one page descriptor for the data; and
      storing, in a second hash table in memory, a reference to at least one page descriptor for the data in the metadata log.

2. The method of claim 1, wherein the threshold is 1 MB.

3. The method of claim 1, further comprising:
   receiving, by the processor, a request to read the data;
   checking the first and second hash tables for entries associated with the data.

4. The method of claim 3, further comprising:
   when both the first and second hash tables include entries associated with the data,
      using the reference, from the first hash table, to the first page descriptor in the metadata log to retrieve the data from the solid state device;
      using the reference, in the second hash table, to the at least one page descriptor in the metadata log to retrieve the data from the non-volatile random access memory.

5. The method of claim 4, further comprising:
   replacing at least a portion of the data from the solid state device with the data from the non-volatile random access memory.

6. The method of claim 4, further comprising:
   comparing a sequence number in the first page descriptor associated with the data from the solid state device and a sequence number in the at least one page descriptor associated with the data from the non-volatile random access memory.

7. The method of claim 6, further comprising:
   if the sequence number for the data from the non-volatile random access memory is larger than the sequence number for the data from the solid state device, replacing at least a portion of the data from the solid state device with the data from the non-volatile random access memory.

8. The method of claim 6, further comprising
   if the sequence number for the data from the non-volatile random access memory is smaller than the sequence number for the data from the solid state device, responding to the read request with the data from the solid state device.

9. The method of claim 3, further comprising:
   when the second hash table, but not the first hash table, includes an entry associated with the data, retrieving the data from the non-volatile random access memory.

10. A system comprising at least one processor configured to:
    receive a request to write data;
    compare a size of the data in the write request to a threshold;
    when the size of the data exceeds the threshold,
       store the data on a solid state device;
       store, in a metadata log, page descriptors for the data on the solid state device; and
       store, in a first hash table in memory, a reference to a first page descriptor of the page descriptors in the metadata log; and
    when the size of the data is below the threshold,
       store the data in a non-volatile random access memory;
       store, in the metadata log, at least one page descriptor for the data; and
       store, in a second hash table in memory, a reference to at least one page descriptor for the data in the metadata log.

11. The system of claim 10, wherein the threshold is 1 MB.

12. The system of claim 10, wherein the at least one processor is further configured to:
    receive a request to read the data;
    check the first and second hash tables for entries associated with the data.

13. The system of claim 12, wherein the at least one processor is further configured to:
    when both the first and second hash tables include entries associated with the data,
       use the reference, from the first hash table, to the first page descriptor in the metadata log to retrieve the data from the solid state device;
       use the reference, in the second hash table, to the at least one page descriptor in the metadata log to retrieve the data from the non-volatile random access memory.

14. The system of claim 13, wherein the at least one processor is further configured to:
    replace at least a portion of the data from the solid state device with the data from the non-volatile random access memory.

15. The system of claim 13, wherein the at least one processor is further configured to:

compare a sequence number in the first page descriptor associated with the data from the solid state device and a sequence number in the at least one page descriptor associated with the data from the non-volatile random access memory.

16. The system of claim 15, wherein the at least one processor is further configured to:
   if the sequence number for the data from the non-volatile random access memory is larger than the sequence number for the data from the solid state device, replace at least a portion of the data from the solid state device with the data from the non-volatile random access memory.

17. The system of claim 15, wherein the at least one processor is further configured to:
   if the sequence number for the data from the non-volatile random access memory is smaller than the sequence number for the data from the solid state device, respond to the read request with the data from the solid state device.

18. The system of claim 12, wherein the at least one processor is further configured to:
   when the second hash table, but not the first hash table, includes an entry associated with the data, retrieve the data from the non-volatile random access memory.

19. A non-transitory computer-readable storage medium having stored thereon program code of one or more software programs, wherein the program code when executed by at least one computing device causes the at least one computing device to perform the following steps:
   receiving, by a processor, a request to write data;
   comparing a size of the data in the write request to a threshold;
   when the size of the data exceeds the threshold,
      storing the data on a solid state device;
      storing, in a metadata log, page descriptors for the data on the solid state device; and
      storing, in a first hash table in memory, a reference to a first page descriptor of the page descriptors in the metadata log; and
   when the size of the data is below the threshold,
      storing the data in a non-volatile random access memory;
      storing, in the metadata log, at least one page descriptor for the data; and
      storing, in a second hash table in memory, a reference to at least one page descriptor for the data in the metadata log.

20. The computer-readable storage medium of claim 19, wherein the threshold is 1 MB.

\* \* \* \* \*